(12) United States Patent
Clarke

(10) Patent No.: US 6,234,191 B1
(45) Date of Patent: May 22, 2001

(54) RAILROAD CAR BRAKE MANIFOLD

(76) Inventor: Bryan J. Clarke, 2828 Village Green Dr., Apt. 3, Aurora, IL (US) 60504

( * ) Notice: Subject to any disclaimer, the term of this patent is extended or adjusted under 35 U.S.C. 154(b) by 0 days.

(21) Appl. No.: 09/419,758

(22) Filed: Oct. 19, 1999

(51) Int. Cl.[7] ..................................................... F16K 1/00
(52) U.S. Cl. ..................... 137/347; 137/269; 137/561 A; 137/884; 137/833
(58) Field of Search ........................... 137/884, 561 A, 137/269, 833, 347

(56) References Cited

U.S. PATENT DOCUMENTS

| | | | |
|---|---|---|---|
| 3,495,604 | * 2/1970 | Trask | 137/884 |
| 3,698,432 | * 10/1972 | Kutz | 137/884 |
| 4,449,426 | 5/1984 | Younger | 137/884 |
| 4,951,709 | 8/1990 | Kirkham | 137/561 A |
| 5,176,359 | * 1/1993 | Leveson et al. | 137/884 |
| 5,462,087 | * 10/1995 | Fukano et al. | 137/884 |
| 5,803,124 | 9/1998 | Newton et al. | 137/884 |

FOREIGN PATENT DOCUMENTS

3831255 A1 * 3/1989 (DE) ..................................... 137/884

* cited by examiner

*Primary Examiner*—A. Michael Chambers
(74) *Attorney, Agent, or Firm*—Bell, Boyd & Lloyd LLC

(57) ABSTRACT

The present invention relates to a railroad car brake manifold adapted to be attached to the pipe brackets on existing railroad cars to provide sufficient pneumatic chambers and channels to perform the required pneumatic logic flow for pneumatic devices attached to the manifold, accomplish pneumatic timing function and provide system stabilization for electronically controlled pneumatic braking systems.

14 Claims, 17 Drawing Sheets

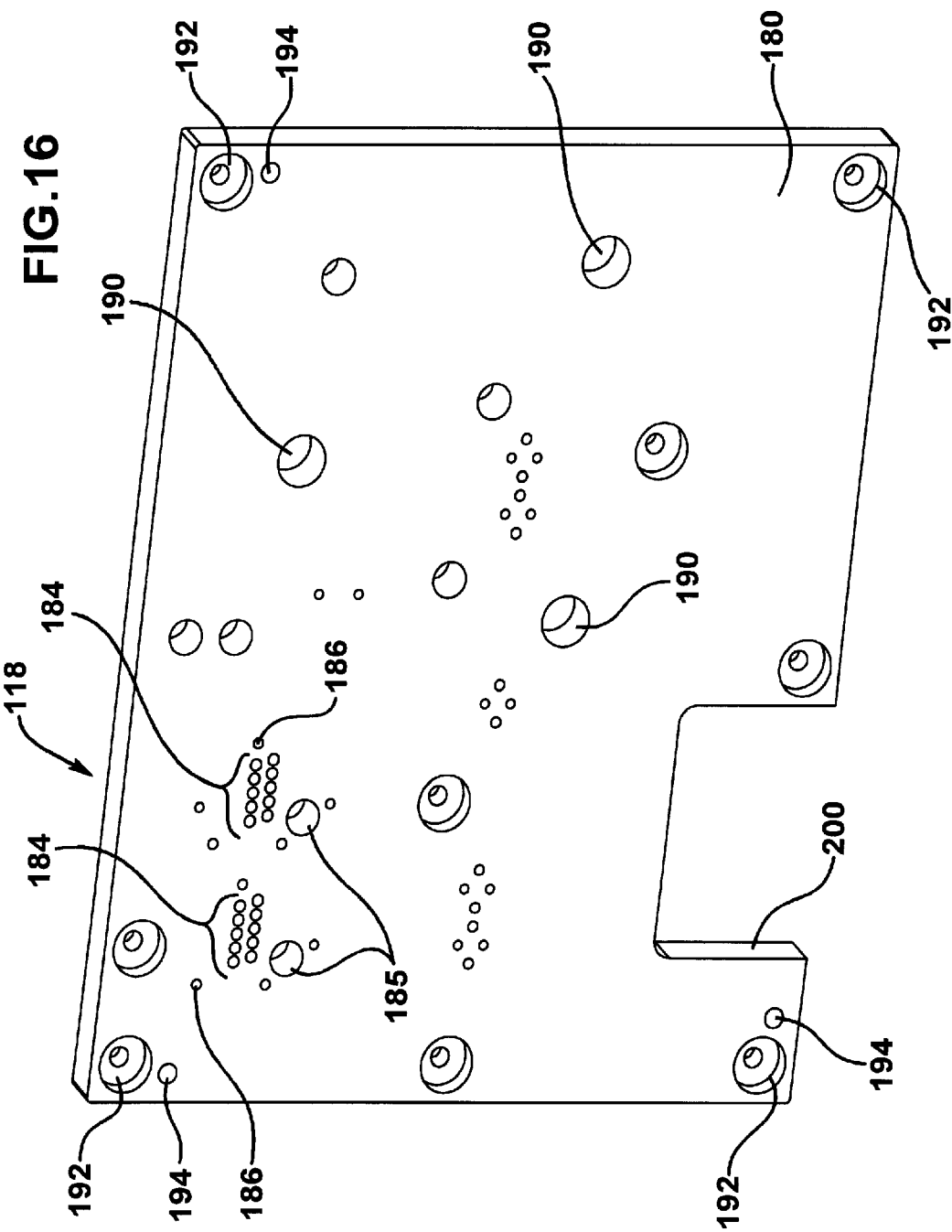

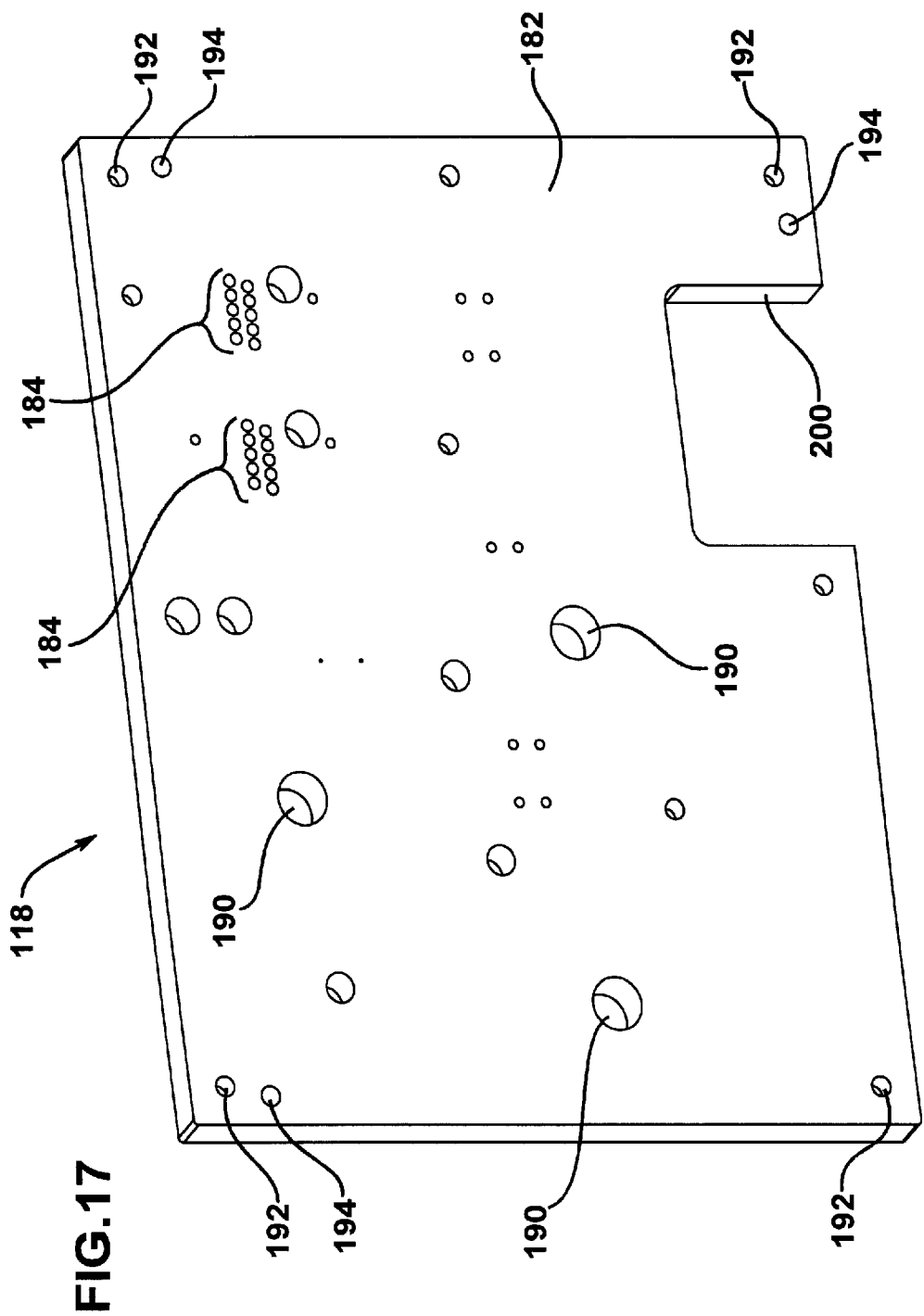

RAILROAD CAR BRAKE MANIFOLD

DESCRIPTION

The present invention relates in general to a railroad car brake manifold, and in particular to a railroad car brake manifold adapted to be attached to the pipe bracket on existing railroad cars and to provide sufficient pneumatic chambers and channels for the pneumatic devices attached to the manifold in electronically controlled pneumatic braking systems.

BACKGROUND OF THE INVENTION

Railroad trains in North America, Europe and substantial parts of the world are equipped with some form of automatic pneumatic brake systems, sometimes referred to as "air brakes." Air brakes provide a reliable and generally fail-safe system for permitting the engineer, conductor or other train crew to apply the brakes throughout the train as well on the locomotive. Air brake systems are continuous power brake systems having an air compressor on the locomotive connected to a brake pipe extending throughout the train. The locomotive includes an automatic brake valve. The engineer uses the automatic brake valve to reduce the air pressure in the brake pipe to apply the brakes, or to increase the air pressure in the brake pipe to release the brakes. Each railroad car in the train has a control valve which senses a "reduction" or "increase" of air pressure in the brake pipe, and applies or releases the brakes according to the "reduction" or "increase" command, respectively. The control valves vary in construction and in operating features to suit freight or passenger trains.

While air brakes are used on both freight and passenger trains, the demands on each system are quite different due to the length of the train, the weight of the train, the speed of the train and other factors. The length of the train is especially important since air pressure reductions in the brake pipe travel at approximately the speed of sound. In a long freight train, such as one having one hundred fifty cars and a possible length of one and one-half miles, it takes approximately eighteen seconds for an air pressure reduction initiated in the locomotive to reach the last car in the train. Accordingly, in the known automatic pneumatic brake systems on freight trains, the build-up of brake cylinder pressure has to be carefully retarded in the front cars to prevent the last cars of the train, where the brakes have not yet been applied due to the signal delay, from running into the front cars. Consequently, full pressure braking is delayed and braking distances are longer. On shorter trains such as passenger trains, this is not such a significant problem, even though there is some delay between the braking of the first and last cars.

To solve these problems, electronically controlled pneumatic brake systems have been proposed and are currently being developed and tested. Electronically controlled pneumatic brake systems generally include a computer controlled network wherein the locomotive is equipped with a head end unit or a master controller for controlling braking throughout the train, and each car is equipped with a car control device for controlling braking on the car based on signals from the master controller. The electronically controlled pneumatic brake system provides substantially instantaneous and simultaneous brake signals to all of the cars in the train, which enables all of the cars to brake at substantially the same time (i.e., increasing the rate of brake cylinder pressure build-up). Electronically controlled pneumatic brake systems incorporate many of the parts of the automatic pneumatic brake system equipment including the brake pipe, the reservoir tanks, the pipe bracket, the brake cylinder(s) and the rigging or linkage between the brake cylinder and the brakes. The car control devices include pneumatic devices (such as solenoid actuated pneumatic valves) which are suitably attached to one or more manifolds mounted on the existing pipe bracket.

Various manifolds for electronically controlled pneumatic braking systems have been suggested using multiple plates. Some of the problems associated with manifolds having two or three plates are described in detail in U.S. Pat. No. 5,803,124. Generally, prior manifold designs allowed the adhesive which was used to bond the plates of the manifold together to sometimes block the narrow channels, and required channels with circuitous paths to avoid the crossing or overlapping of channels. U.S. Pat. No. 5,803,124 discloses a three plate manifold which purportedly solves these problems by providing a first plate with chambers and passageways on its interior surface, a second plate with chambers and passageways on its interior surface and a center plate abutting the interior surfaces of the first and second plates and having apertures extending through the plate connecting the chambers and passageways in the first and second plates. The separation of the passageways and chambers in the first and second plates by the center plate facilitates straighter paths for the passageways and larger passageways which are not be blocked by excess adhesive.

However, there is a need for other manifold constructions which eliminate the adhesive problem, allow for overlapping channels and chambers, reduce the amount of machining of large plates, include alignment means for assembly of the plates and provide other advantages as described herein.

SUMMARY OF THE INVENTION

The apparatus of the present invention provides a railroad car brake manifold that includes sufficiently sized channels which are not blocked by excess adhesive used to bond the plates, allows for overlapping channels and chambers which reduce the need for circuitous paths, reduces the amount of machining of the plates, and includes alignment means for assembly of the plates. The manifold of the present invention also facilitates the attachment of desired valves to the manifold. The manifold of the present invention provides for appropriate tolerances for relatively small pneumatic devices. The manifold is adapted to be attached to the pipe bracket on existing railroad cars for electronically controlled pneumatic braking systems.

One embodiment of the manifold of the present invention includes two relatively large preferably aluminum plates and two relatively small preferably steel plates. The first large plate has a front face with channels and chambers therein and a back face which is adapted to abut the pipe bracket. The second larger plate has a back face which abuts the front face of the first large plate to cover the channels and chambers in the first large plate. The second large plate includes apertures which extend through the second large plate. Certain of the apertures in the second large plate are arranged as a series of relatively small closely spaced-apart apertures which collectively act as a slot in the second large plate to allow a sufficient volume of air or pneumatic fluid for a desired pneumatic device to pass through the second large plate. This series of apertures significantly reduces the necessary machining of the second larger plate. The first and second large plates include corresponding alignment apertures adapted to receive alignment pins for aligning the plates during assembly.

The first small plate has a front face with channels and chambers therein and a back face which abuts the front face of the second large plate and is mounted over certain pneumatic apertures on the second large plate. The second small plate has a back face which abuts the front face of the second small plate to cover the channels and chambers in the first small plate. The second small plate includes apertures which extend through the second small plate. The steel second small plate has certain relatively small threaded apertures having relatively tight tolerances which are necessary for the relatively small pneumatic devices, and in particular for relatively small solenoid valves mounted on the manifold. This manifold construction allows the channels and chambers in the front face of the first large plate and the channels and chambers in the front face of the first small plate to overlap, to be made larger to avoid adhesive blocking problems and to have less circuitous paths.

A further embodiment of the manifold of the present invention includes three similarly sized preferably aluminum plates. The first plate has a front face with channels and chambers therein and a back face which is adapted to abut the pipe bracket. The second plate also has a front face with channels and chambers therein and a back face which is adapted to abut the front face of the first plate to cover the channels and chambers in the front face of the first plate. The third plate has a back face which is adapted to abut the front face of the second plate to cover the channels and chambers in the front face of the second plate. The first plate includes apertures which are connected to the channels and chambers in the first plate, and which extend through the first plate to the second plate. The second plate includes apertures which are connected to the channels and chambers into the second plate and which extend through the second plate from the first plate to the third plate. The third plate includes apertures which extend through the third plate. Certain of these apertures in the third plate are arranged as a series of relatively small closely spaced-apart apertures which collectively act as a slot in the third plate to allow a sufficient volume of air or pneumatic fluid for a pneumatic device to pass through the third large plate. These closely spaced-apart apertures reduce the amount of necessary machining in the third plate. The third plate also includes a slot or cut-out which enables a pneumatic device to extend through the third plate and be mounted directly on the front face of the second plate. The first, second and third plates also include corresponding alignment apertures adapted to receive alignment pins for properly aligning the plates during assembly. This manifold construction allows the channels and chambers in the front face of the first plate and the channels and chambers in the front face of the second plate to overlap, to be made larger to avoid adhesive blockage problems and to have less circuitous paths.

It is therefore an object of the present invention to provide a railroad car brake manifold for electronically controlled pneumatic braking systems.

Another object of the present invention is to provide a railroad car brake manifold adapted to be attached to the pipe bracket on existing railroad cars and which provides sufficient pneumatic chambers and channels for the pneumatic devices attached to the manifold in electronically controlled pneumatic braking systems.

A further object of the present invention is to provide a railroad car brake manifold which reduces the necessary machining during manufacture of the manifold.

A yet further object of the present invention is to provide a railroad car brake manifold which includes multiple plates and alignment means for aligning the plates during assembly.

A still further object of the present invention is to provide a railroad car brake manifold which provides for the attachment of pneumatic devices to the manifold.

Other objects, features and advantages of the present invention will be apparent from the following detailed disclosure, taken in conjunction with the accompanying sheets of drawings, wherein like numerals refer to like parts.

BRIEF DESCRIPTION OF THE DRAWINGS

FIG. 16 is a perspective view of the front face of the top or third plate 118 of the manifold illustrated in FIG. 9; and FIG. 17 is a perspective view of the back face of the top or third plate 118 of the manifold illustrated in FIG. 9.

DETAILED DESCRIPTION OF THE INVENTION

Figure 1:
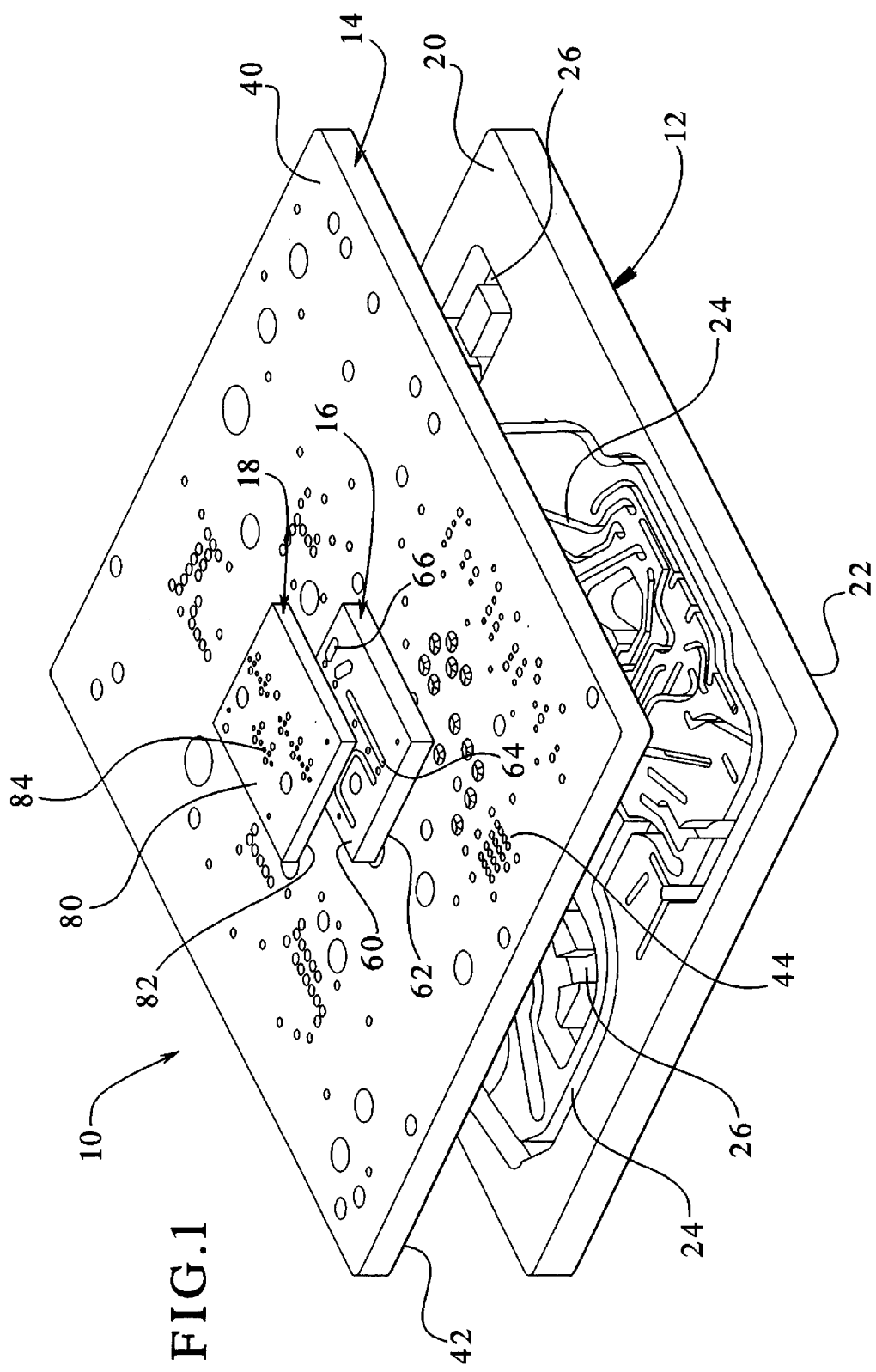
FIG. 1 is a front perspective view of a manifold 10 of the present invention illustrating a first large plate 12 having pneumatic channels and chambers, a second large plate 14 having pneumatic ports or apertures, a first small plate 16 having pneumatic channels and chambers and a second small plate 18 having pneumatic apertures.
Figure 2:
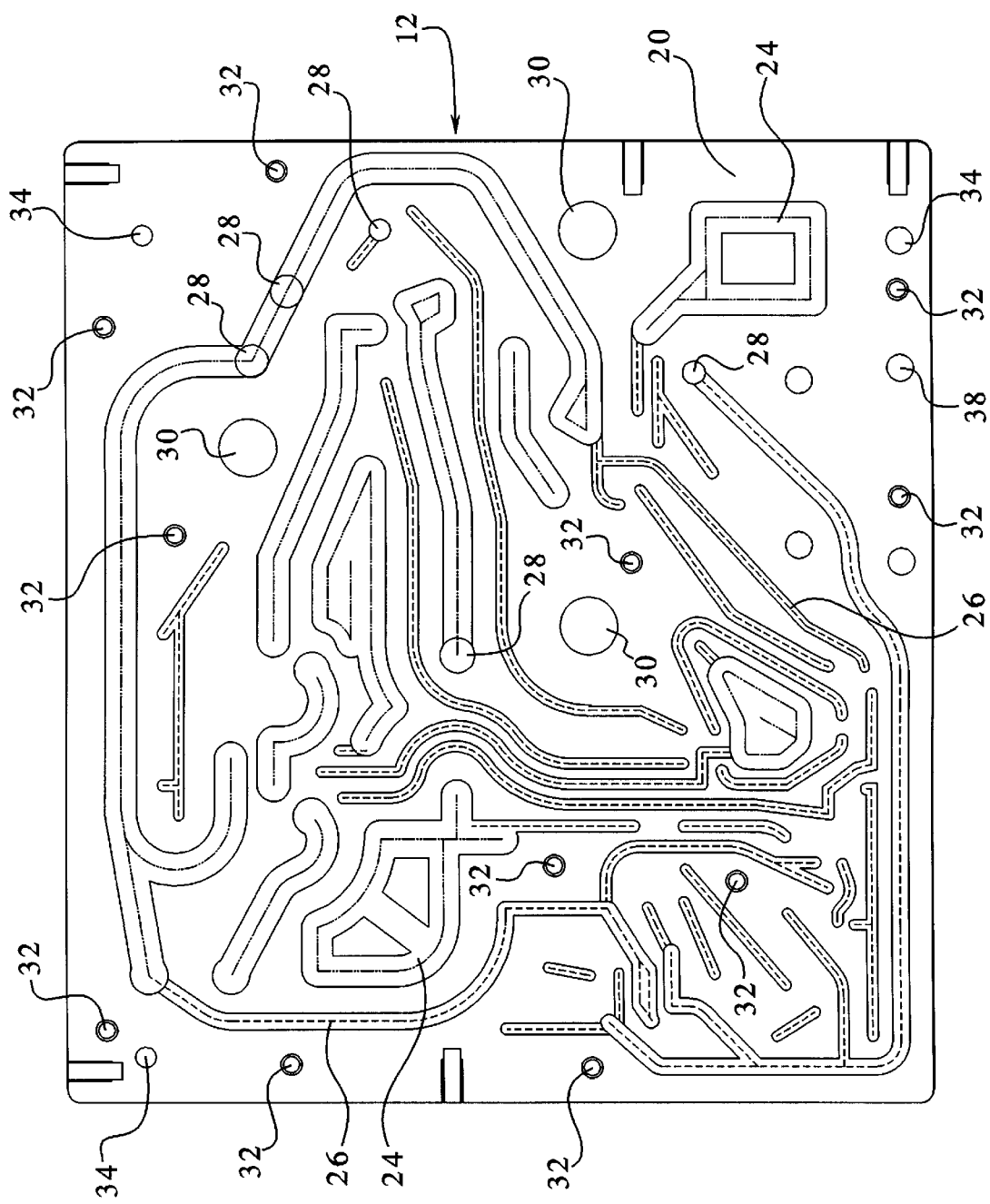
FIG. 2 is a top plan view of the front face of the first large plate 12 of the manifold illustrated in FIG. 1.

Referring now to the drawings, and particularly to FIGS. 1 to 8, an air brake manifold of the present invention, generally indicated by numeral 10, is adapted to be mounted to a pipe bracket (not shown) on a railroad car or vehicle (not shown). A plurality of pneumatic devices such as solenoid actuated valves (not shown) are adapted to be mounted on the manifold 10 opposite the pipe bracket. The manifold 10 thus includes ports for one or more pneumatic devices, sources of pneumatic fluid (such as the pipe bracket) and pneumatic circuits connected to the manifold.

Manifold 10 includes plates 12, 14, 16 and 18. Plates 12 and 14 are preferably larger than plates 16 and 18 as illustrated in FIG. 1. Specifically, based on the size of the conventional pipe bracket, plates 12 and 14 are preferably approximately 11½ by 10½ inches and plates 16 and 18 are approximately 2½ by 2½ inches, although it should be appreciated that the size of the plates could vary.

Plate 12 includes a front face 20 and a back face 22. The back face 22 is adapted to be aligned with and to engage or abut the pipe bracket (not shown). Plate 12 includes a plurality of channels 24 and chambers 26 machined or otherwise formed in the front face 20. (FIG. 2) The channels 24 and chambers 26 perform the required pneumatic logic flow of the manifold 10, provide passageways to the various pneumatic devices, accomplish pneumatic timing functions and provide system stabilization. Channels and chambers are sometimes collectively referred to herein as the "circuitry." Plate 12 includes pneumatic inlet and outlet ports or apertures 28 of varying size for facilitating pneumatic communication between (or interfacing between) the pipe bracket and the circuitry in plate 12, plates 14, 16 and 18, and pneumatic devices (not shown) mounted on plates 14 and 18. Plate 12 also includes mounting apertures 30 for facilitating mounting the manifold 10 to the pipe bracket, blind bolt apertures 32 for facilitating the fastening or attachment of the plates 12 and 14 to each other, and alignment apertures 34 for receiving alignment pins (not shown) for aligning plates 12 and 14 during assembly.

Figure 3:
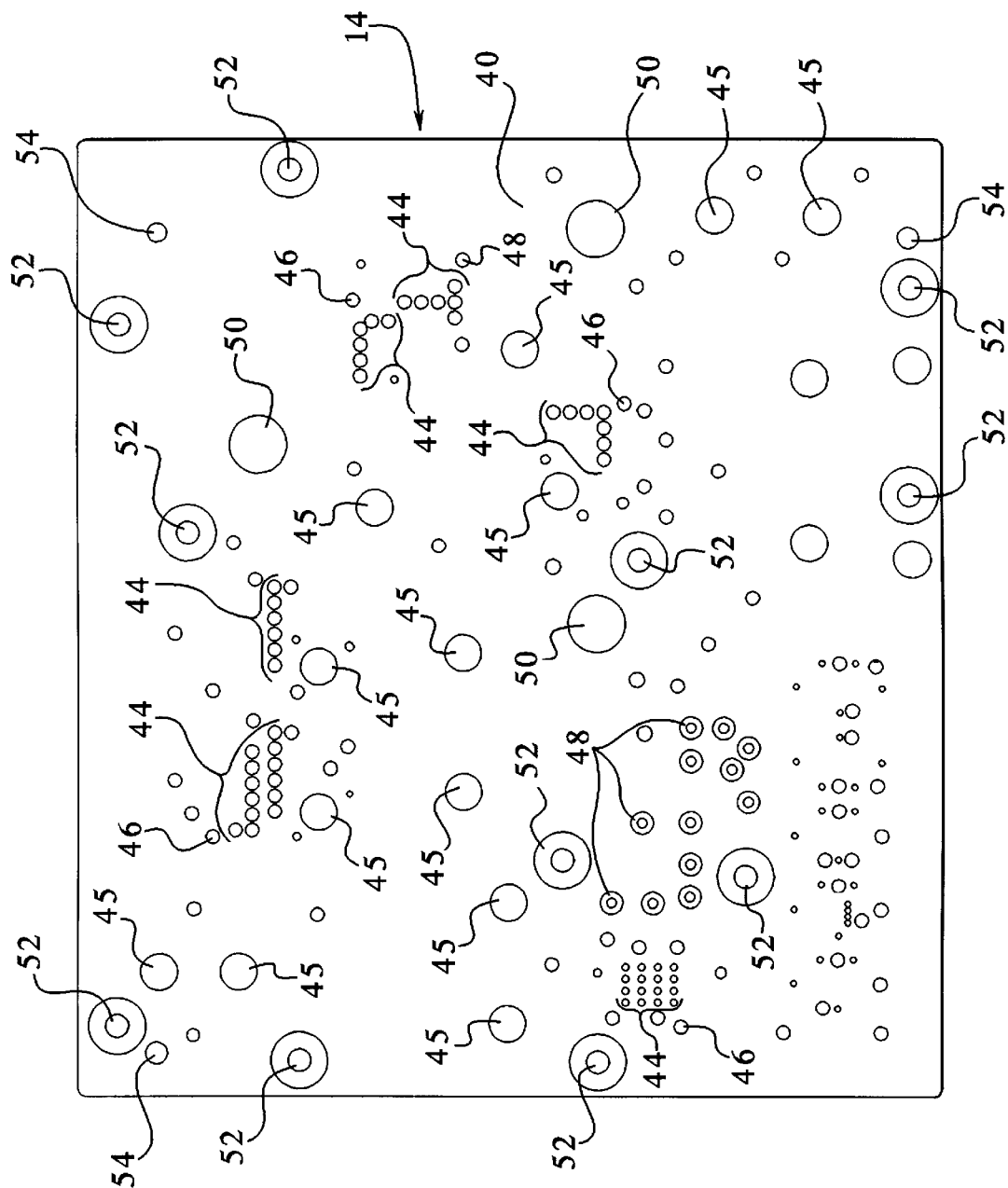
FIG. 3 is a top plan view of the front face of the second large plate 14 of the manifold illustrated in FIG. 1.
Figure 4:
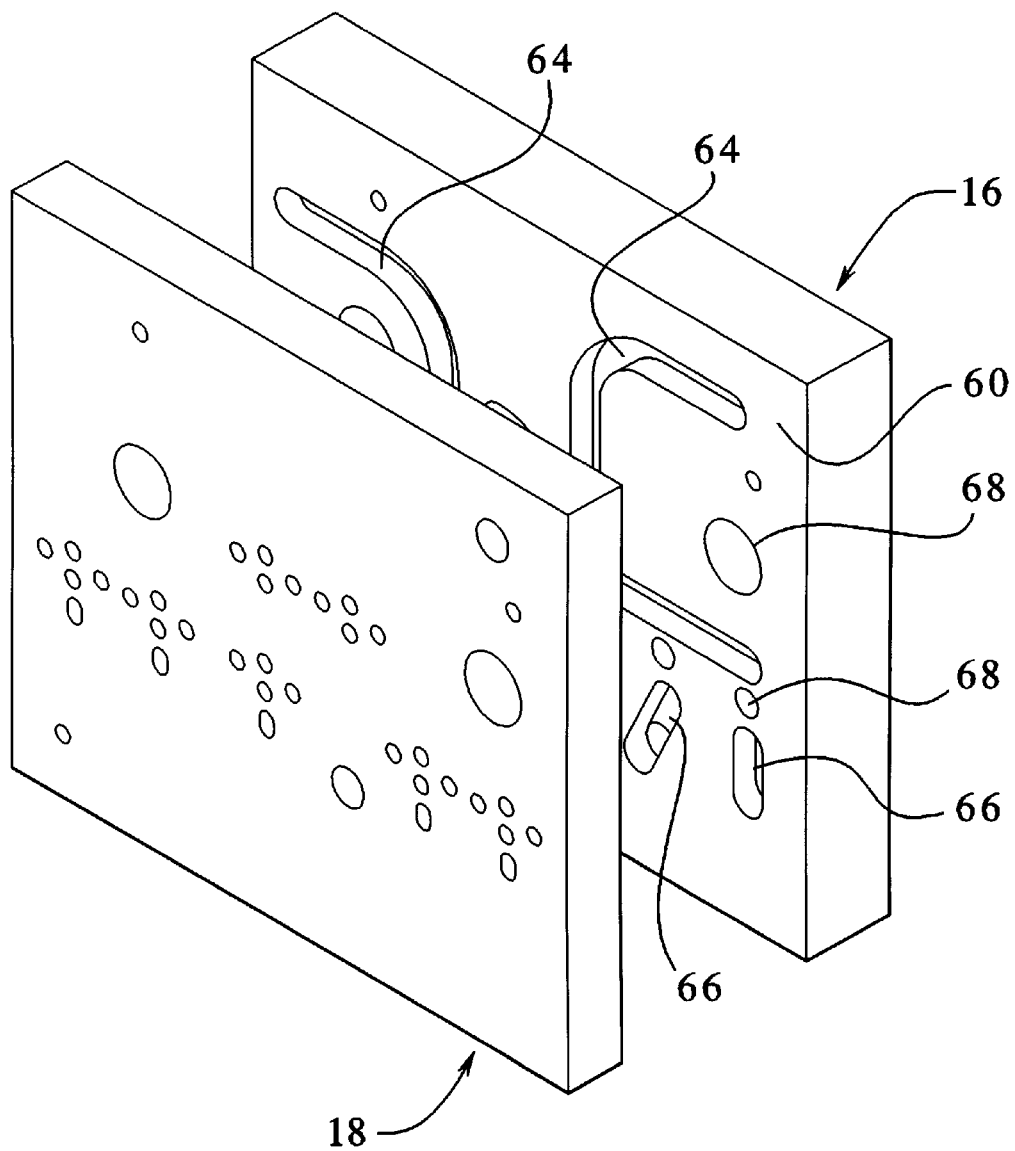
FIG. 4 is a front perspective view of the first small plate 16 and the second small plate 18 of the manifold illustrated in FIG. 1.

Plate 14 includes a front face 40 and a back face 42. The back face 42 is adapted to be aligned with and to engage or abut the front face 20 of plate 12 to cover or close the channels and chambers in the front face of plate 12. Plate 14 does not include any circuitry. Plate 14 contains a plurality of sets of closely spaced-apart relatively small diameter pneumatic inlet and outlet ports or apertures 44 for facilitating pneumatic communication with pneumatic devices (not shown) mounted on plate 14 (FIG. 3). Each set of closely spaced apertures 44 collectively allow a sufficient volume of pneumatic fluid to pass through the plate 14, which is approximately equal to the amount of pneumatic fluid which would pass through a similarly sized slot in the plate. The apertures 44 are drilled or punched in the plate 14 to save manufacturing time and cost by eliminating machining of slots and thereby provide a more cost effective and efficient approach than machining slots in the plate 14.

Plate 14 further includes pneumatic inlet and outlet ports apertures 45 for facilitating pneumatic communication between the pipe bracket and plates 16 and 18, between the circuitry in plate 12 and pneumatic devices (not shown) mounted on the manifold through plate 14 or plate 18 through plates 14 and 16. Plate 14 includes blind threaded holes 46 adjacent to the pneumatic apertures 44 for facilitating mounting of the pneumatic devices on the front face 40 of plate 14, over the pneumatic apertures 44. Plate 14 further includes pneumatic inlet and outlet ports or apertures 48 for facilitating pneumatic communication between the circuitry in plate 12 and the pneumatic apertures and circuitry in plate 16, mounting apertures 50 aligned with mounting apertures 30 in plate 12 for facilitating mounting the manifold 10 to the pipe bracket, counter-bored bolt apertures 52 aligned with bolt apertures 32 in plate 12 for facilitating the fastening or attachment of the plates 12 and 14 to each other, and alignment apertures 54 corresponding with alignment apertures 34 in plate 12 for receiving alignment pins (not shown) for aligning plates 12 and 14 during manufacture assembly.

Figure 5:
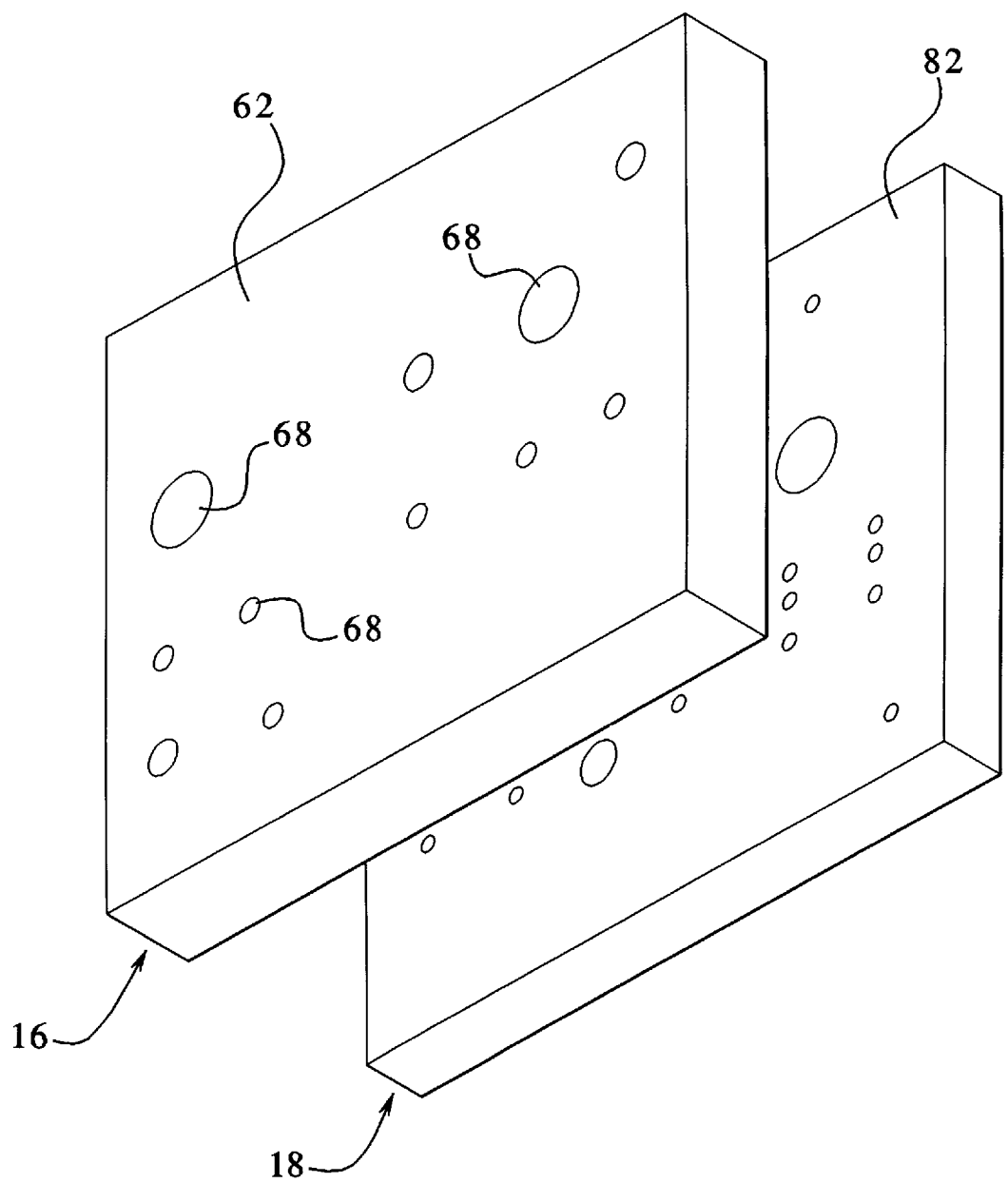
FIG. 5 is a rear perspective view of the first small plate 16 and the second small plate 18 of the manifold illustrated in FIG. 1.
Figure 6:
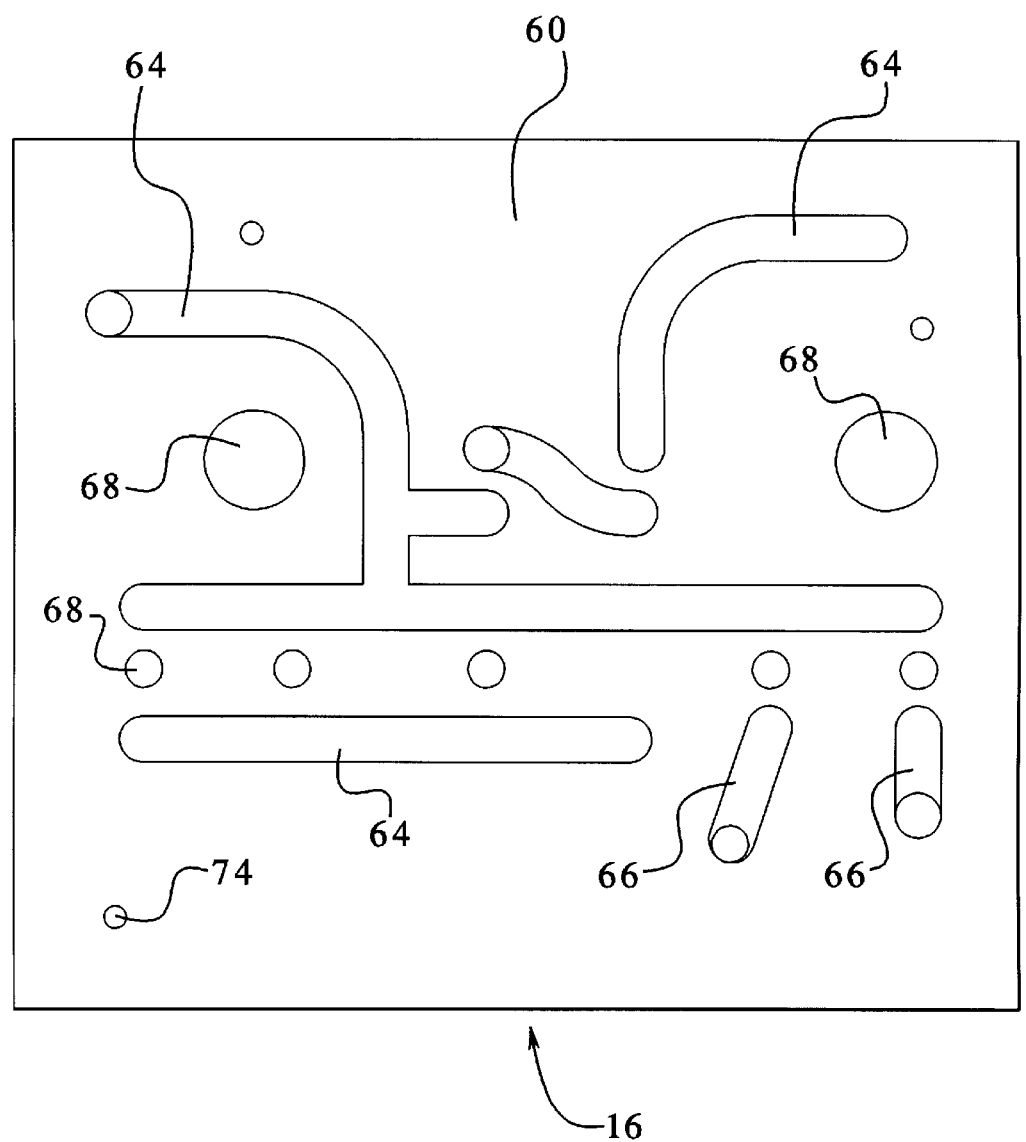
FIG. 6 is a top plan view of the front face of the first small plate 16 of the manifold illustrated in FIG. 1.

Plate 16 includes a front face 60 (FIG. 4) and a back face 62 (FIG. 5). The back face 62 is adapted to be aligned over blind mounting hole apertures 48 and to engage or abut a portion of the front face 40 of plate 14. Plate 16 includes a plurality of channels 64 and chambers 66 machined in the front face 60 to perform the required pneumatic logic flow of the manifold 10, provide passageways to the various pneumatic devices, and to accomplish pneumatic timing functions and to provide system stabilization. Plate 16 contains pneumatic inlet and outlet ports or apertures 68 of varying size for facilitating pneumatic communication between the circuitry in plate 16 and plates 12 and 14, and between the circuitry in plate 16 and the pneumatic devices (not shown) mounted on plate 18. Plate 16 also includes at least one alignment aperture 74 (FIG. 6) for receiving an alignment pin (not shown) for aligning plates 16 and 18.

Figure 7:
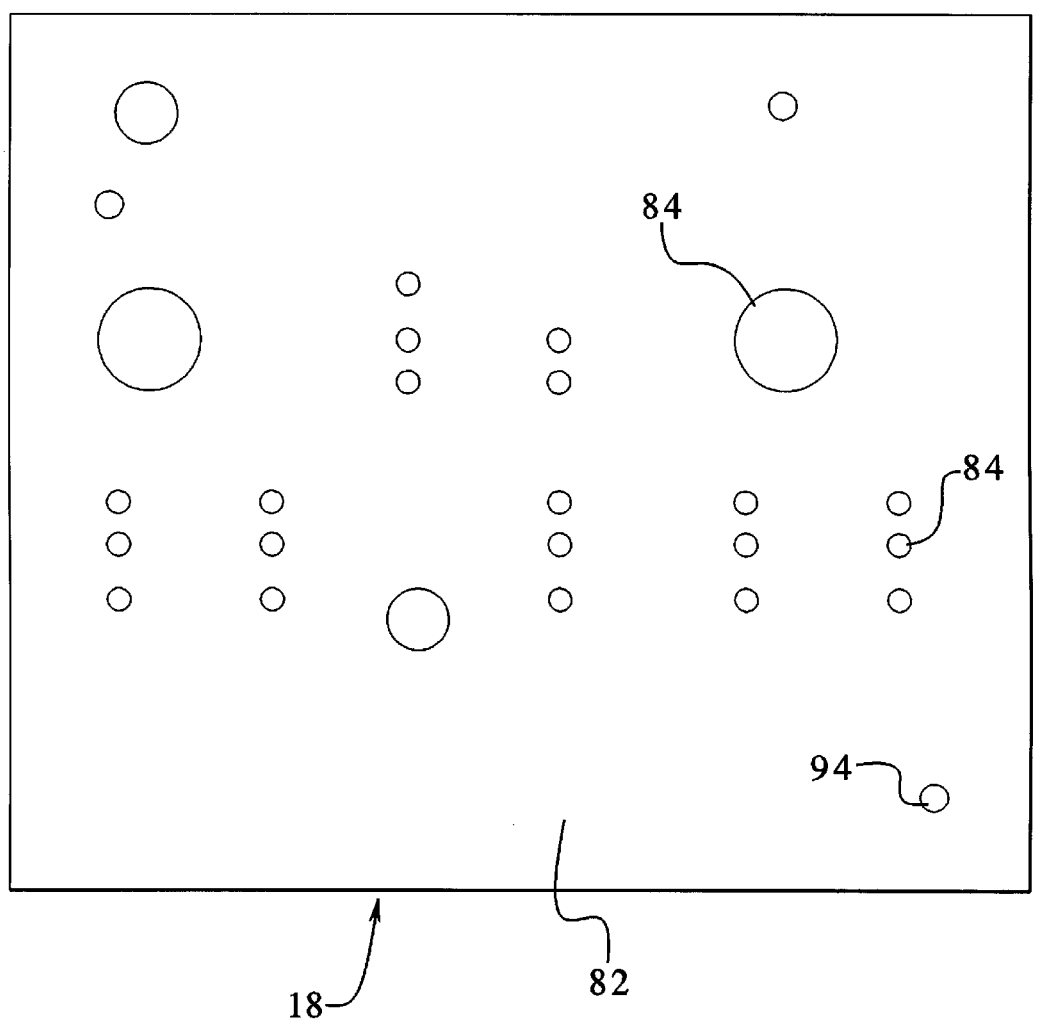
FIG. 7 is a top plan view of the back face of the second small plate 18 of the manifold illustrated in FIG. 1.
Figure 8:
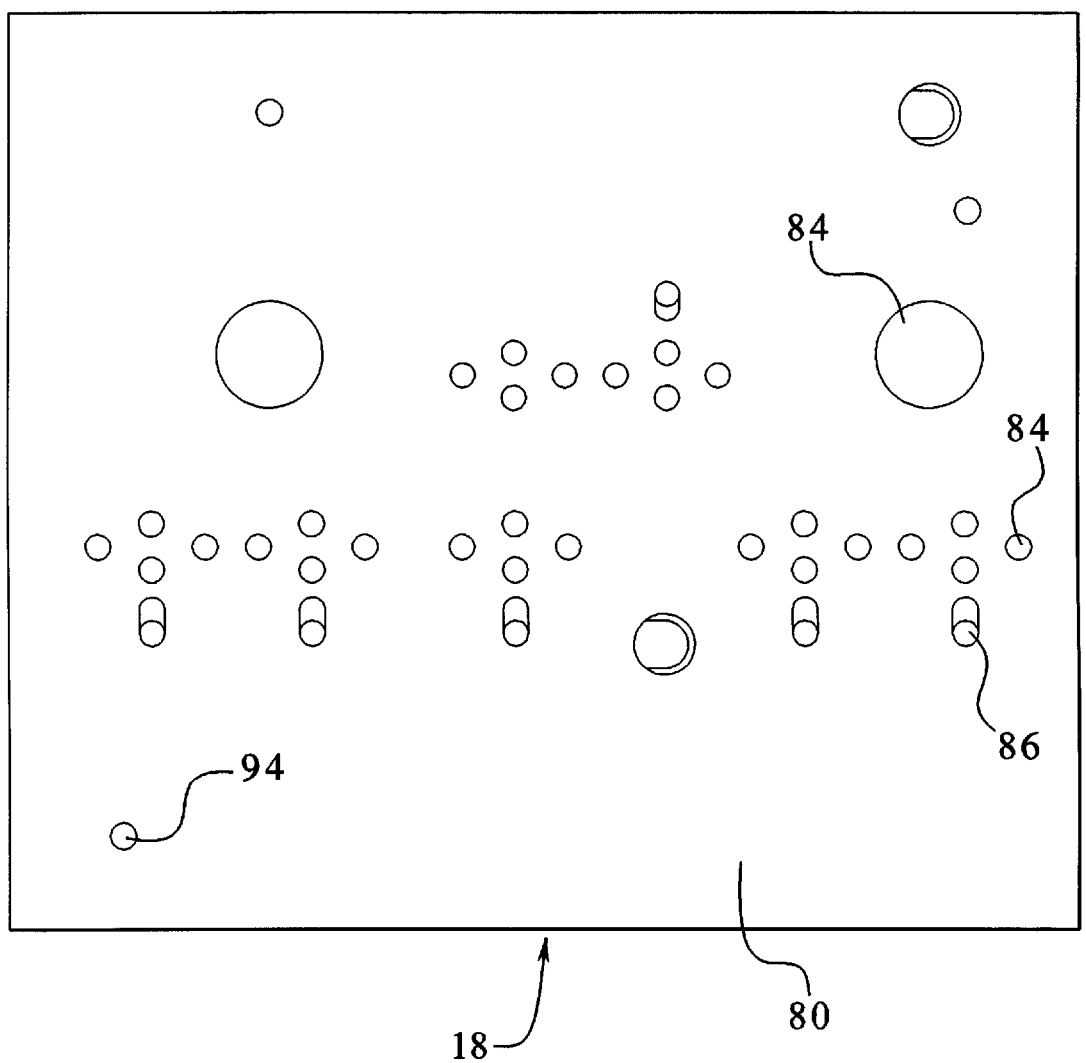
FIG. 8 is a top plan view of the front face of the second small plate 18 of the manifold illustrated in FIG. 1.
Figure 9:
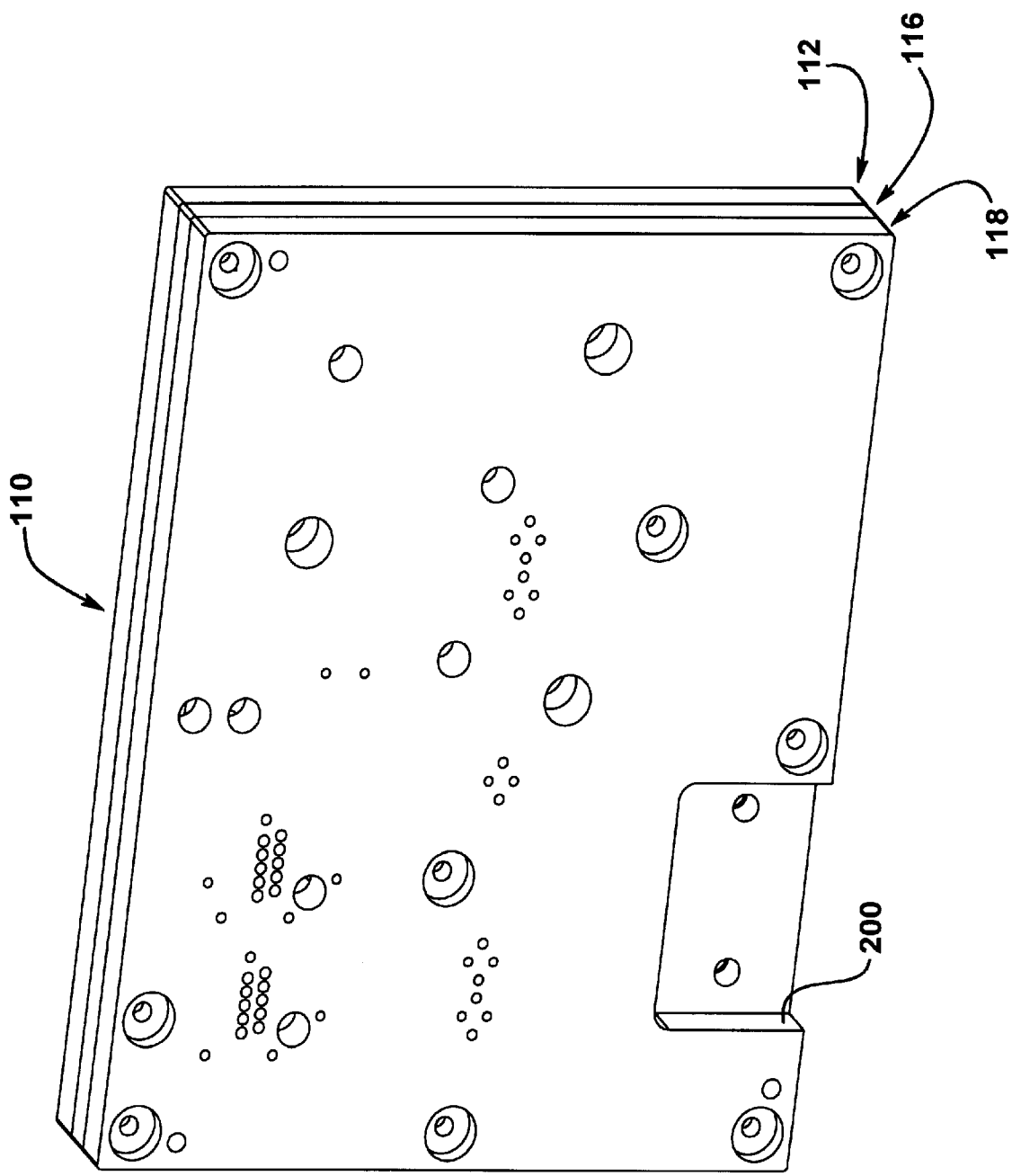
FIG. 9 is a perspective view of an alternative embodiment of the manifold 110 of the present invention having three similarly sized plates.
Figure 10:
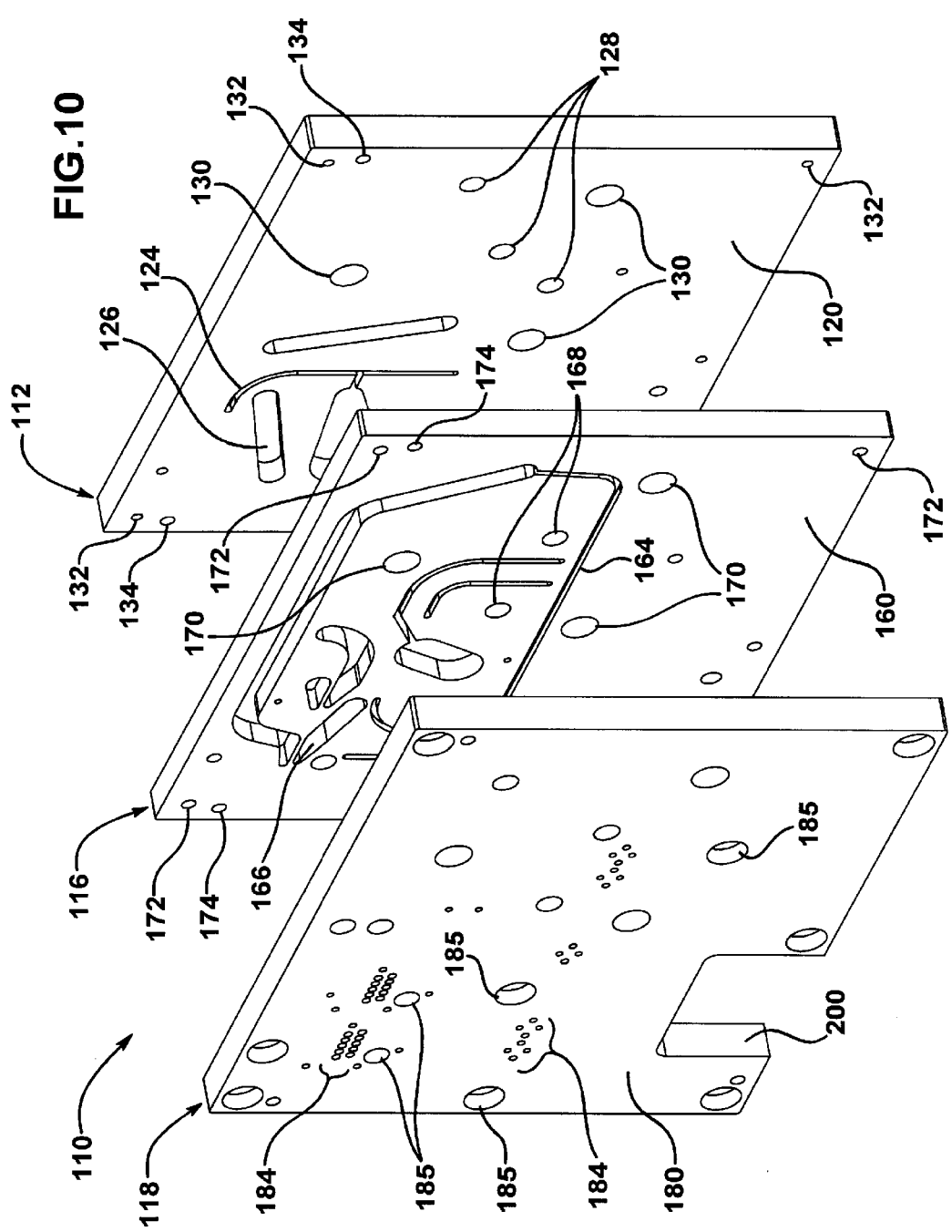
FIG. 10 is an exploded front perspective view of the manifold illustrated in FIG. 9.

Plate 18 includes a front face 80 (FIG. 8) and a back face 82 (FIG. 7). The back face 82 is adapted to be aligned with and to abut the front face 60 of plate 16. Plate 18 does not include any channels or chambers. Plate 18 contains a plurality of pneumatic inlet and outlet ports, through-holes or apertures 84 for facilitating pneumatic communication between plates 12, 14 and 16 and pneumatic devices (not shown) mounted on the front face 80 of plate 18. Plate 18 includes mounting apertures 86 adjacent to the apertures 84 for facilitating mounting of the pneumatic devices (not shown) on the front face 80 of plate 18 over the apertures 84. Plate 18 also includes at least one alignment aperture 94 corresponding with an alignment aperture 74 in plate 16 for receiving alignment pins (not shown) for aligning plates 16 and 18 during assembly.

The plates are made of suitably strong materials to withstand the harsh railcar environment. In particular, plates 12 and 14 are preferably made of aluminum and plates 16 and 18 are preferably made of steel. The strong and durable steel plates 16 and 18 facilitate apertures 84 with suitable relatively tighter tolerances which provide greater efficiency for the pneumatic devices such as the solenoid values attached to plate 18.

In manifold 10, plate 14 functions as a cover plate for or covers the circuitry in the front face 20 of plate 12, and plate 18 functions as a cover plate for or covers the circuitry in the front face 60 of plate 16. This enables the channels and chambers in plate 16 to overlap the channels and chambers in plate 12 which reduces the need for circuitous paths of the channels. Most of the necessary circuitry is placed in plate 12. Plate 16 includes the minimum necessary circuitry and thereby minimizes the size of the plate 16 and the machining of the plate 16. The two small plates 16 and 18 thus reduce machining necessary in the larger plates and provide for the necessary circuitry using minimum sized plates and facilitates less circuitous circuitry.

If additional circuitry is desired, plates 16 and 18 could be made larger. The plates 12 and 14 are mechanically held together by bolts (not shown) received or threaded in bolt apertures 32 (FIG. 2) and 52 (FIG. 3). It should be appreciated that the plates could also be chemically bonded together using bonding agents such as epoxies, urethanes, brazing compounds, and anaerobic chemicals (Locite). Gaskets or O-rings (accompany recessed circular grooves in the plates) may also be used between the plates in a conventional manner.

Referring now to FIGS. 9 to 17, an alternative embodiment of the air brake manifold of the present invention, generally indicated by numeral 110, is adapted to be mounted to a pipe bracket (not shown) on a railroad car or vehicle (not shown). Manifold 110 includes ports for one or more pneumatic devices, sources of pneumatic fluid and pneumatic circuits connected to the manifold. Manifold 110 includes plates 112, 116 and 118. Plates 112, 116 and 118 are preferably of substantially the same size. Specifically, based on the size of the conventional pipe bracket, plates 112, 116 and 118 are preferably approximately 11½ by 10½ inches, although it should be appreciated that the size of the plates could vary.

Figure 11:
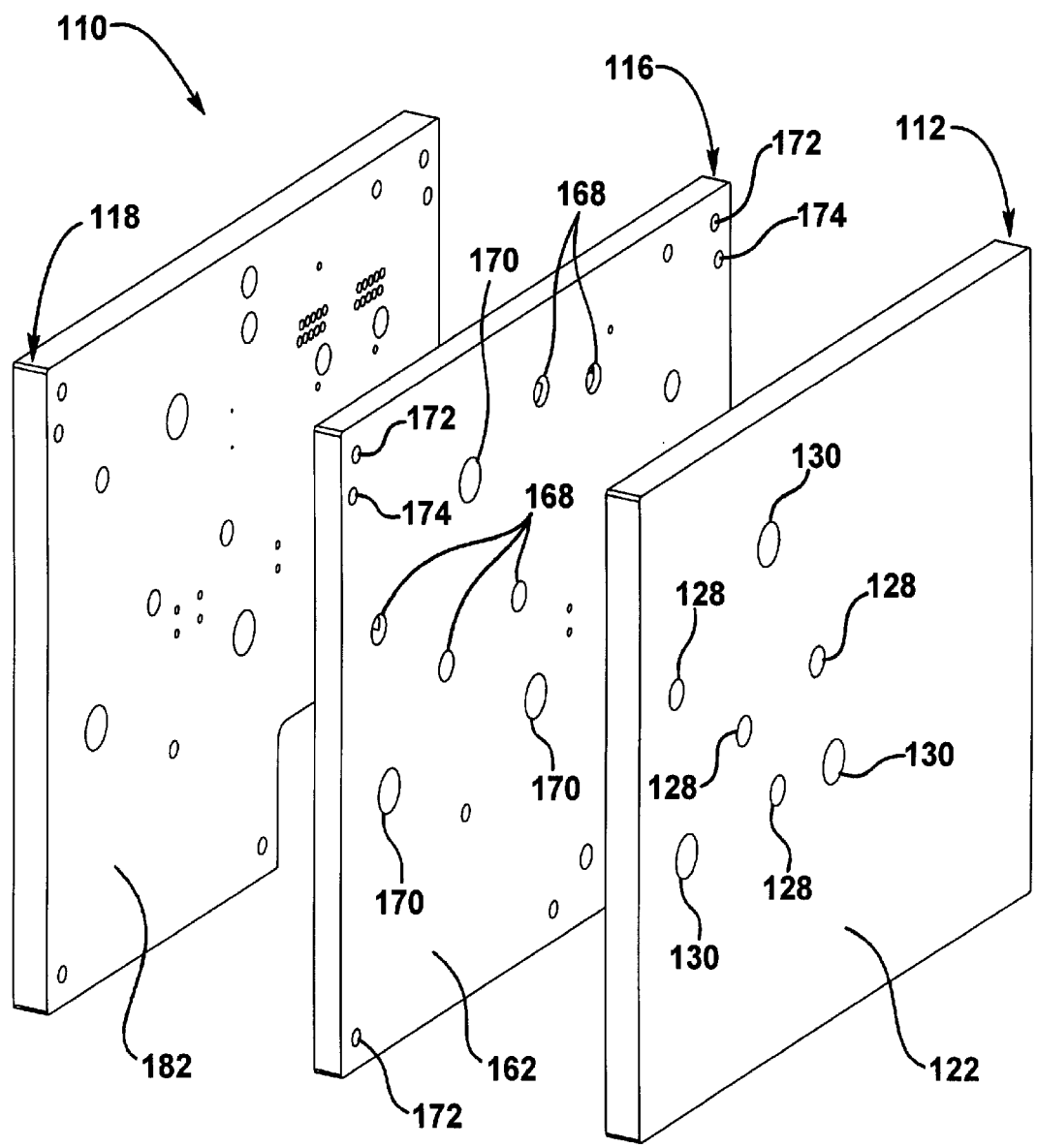
FIG. 11 is an exploded back perspective view of the manifold illustrated in FIG. 9.
Figure 12:
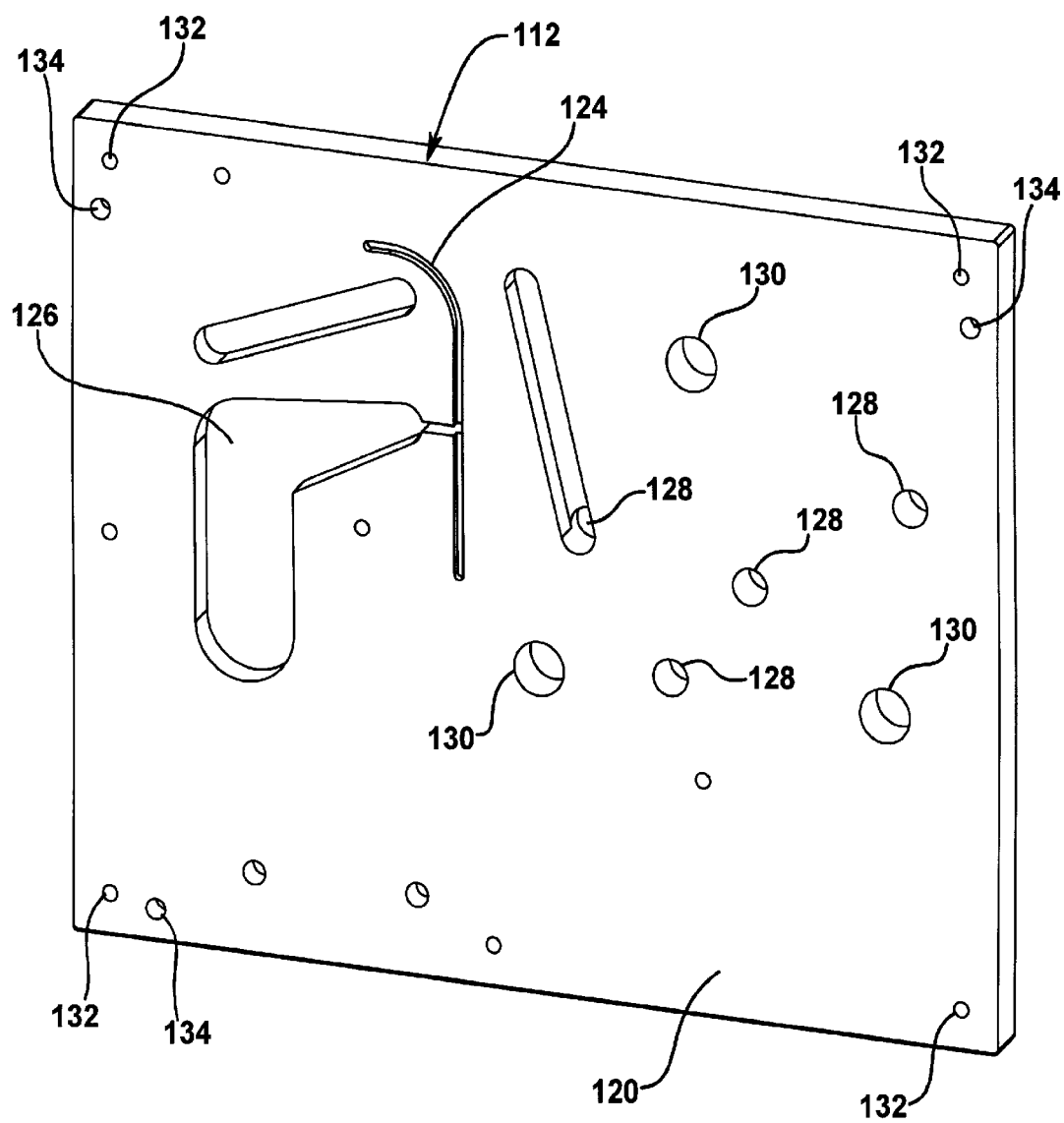
FIG. 12 is a perspective view of the front face of the bottom or first plate 112 of the manifold illustrated in FIG. 9.
Figure 13:
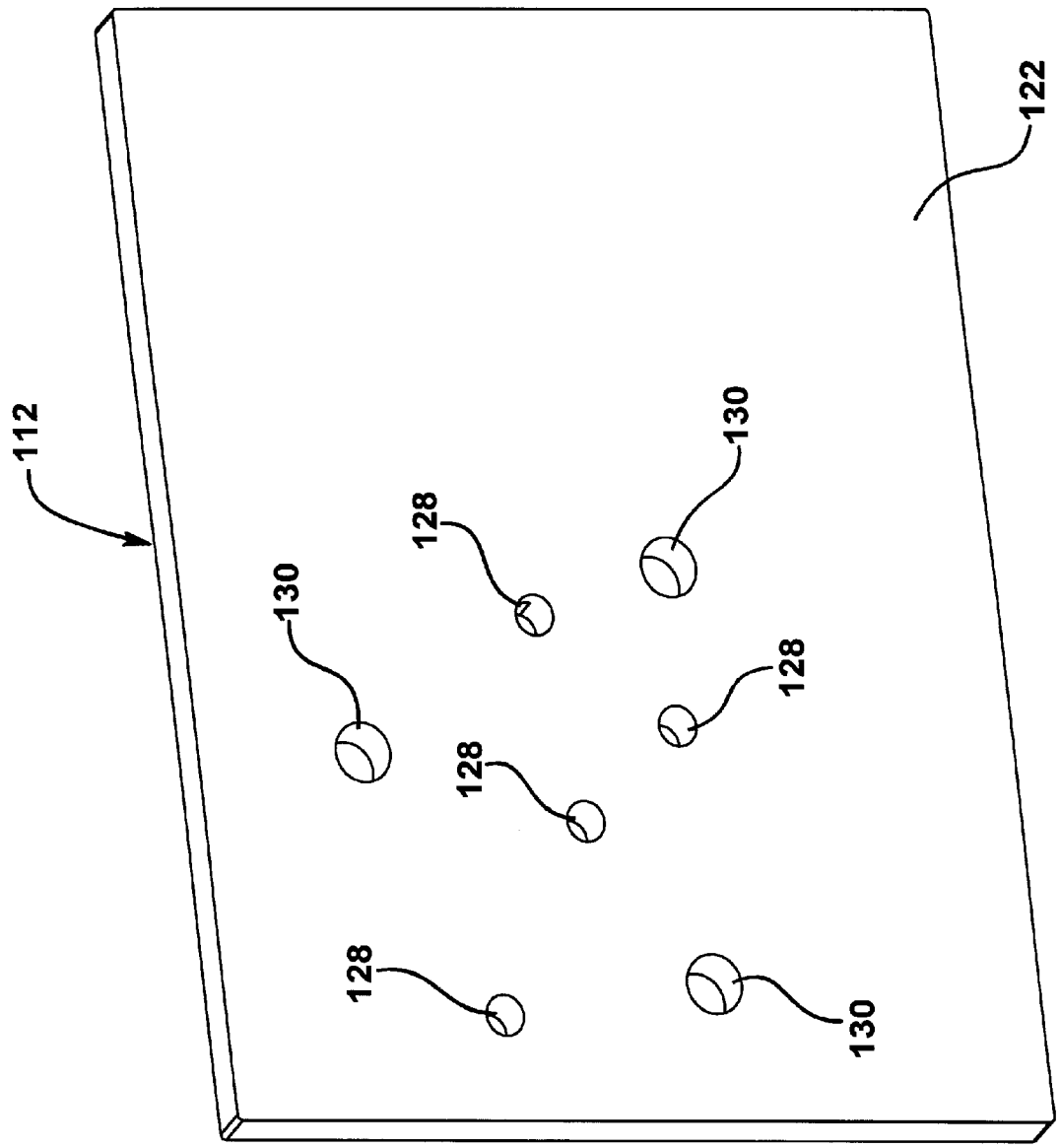
FIG. 13 is a perspective view of the back face of the bottom or first plate 112 of the manifold illustrated in FIG. 9.
Figure 14:
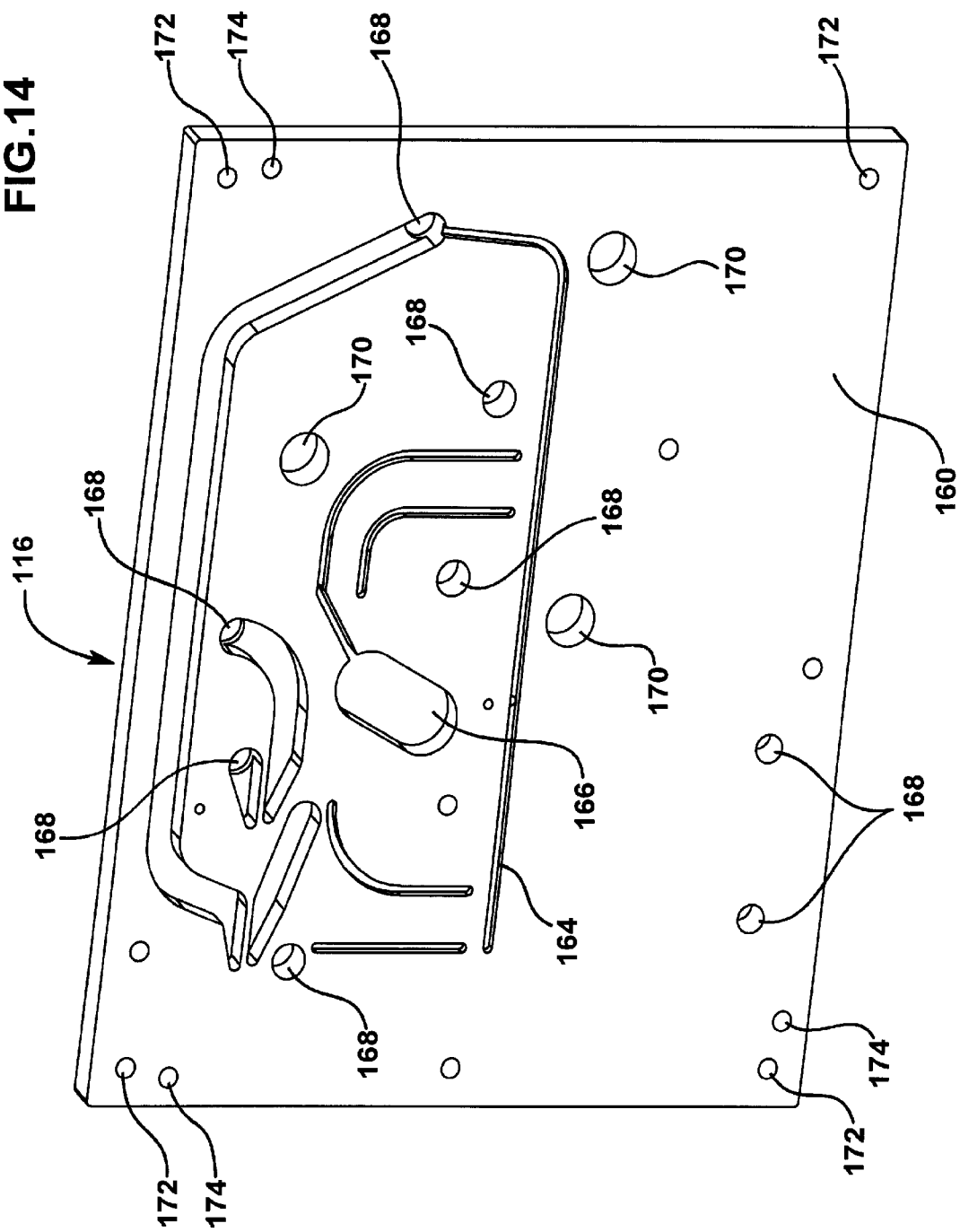
FIG. 14 is a perspective view of the front face of the center or second plate 116 of the manifold illustrated in FIG. 9.

Plate 112 includes a front face 120 (FIGS. 10 and 12) and a back face 122 (FIGS. 11 and 13). The back face 122 is adapted to be aligned with and to engage or abut the pipe bracket (not shown). Plate 112 includes a plurality of channels 124 and chambers 126 machined or otherwise formed in the front face 120. The channels 124 and chambers 126 perform the required pneumatic logic flow of the manifold 110, provide passageways to the various pneumatic devices, accomplish pneumatic timing functions and provide system stabilization. Plate 112 contains pneumatic inlet and outlet ports or apertures 128 of varying size for facilitating pneumatic communication between the pipe bracket and circuitry in plate 112, circuitry in plate 116 and pneumatic devices mounted on the manifold 110. Plate 112 also includes: (i) mounting apertures 130 for facilitating mounting the manifold 110 to the pipe bracket; (ii) blind bolt apertures 132 for facilitating the fastening or attachment of the plates 112, 116 and 118 to each other; and (iii) alignment apertures 134 for receiving alignment pins (not shown) for aligning the plates 112,116 and 118 during manufacture assembly.

Figure 15:
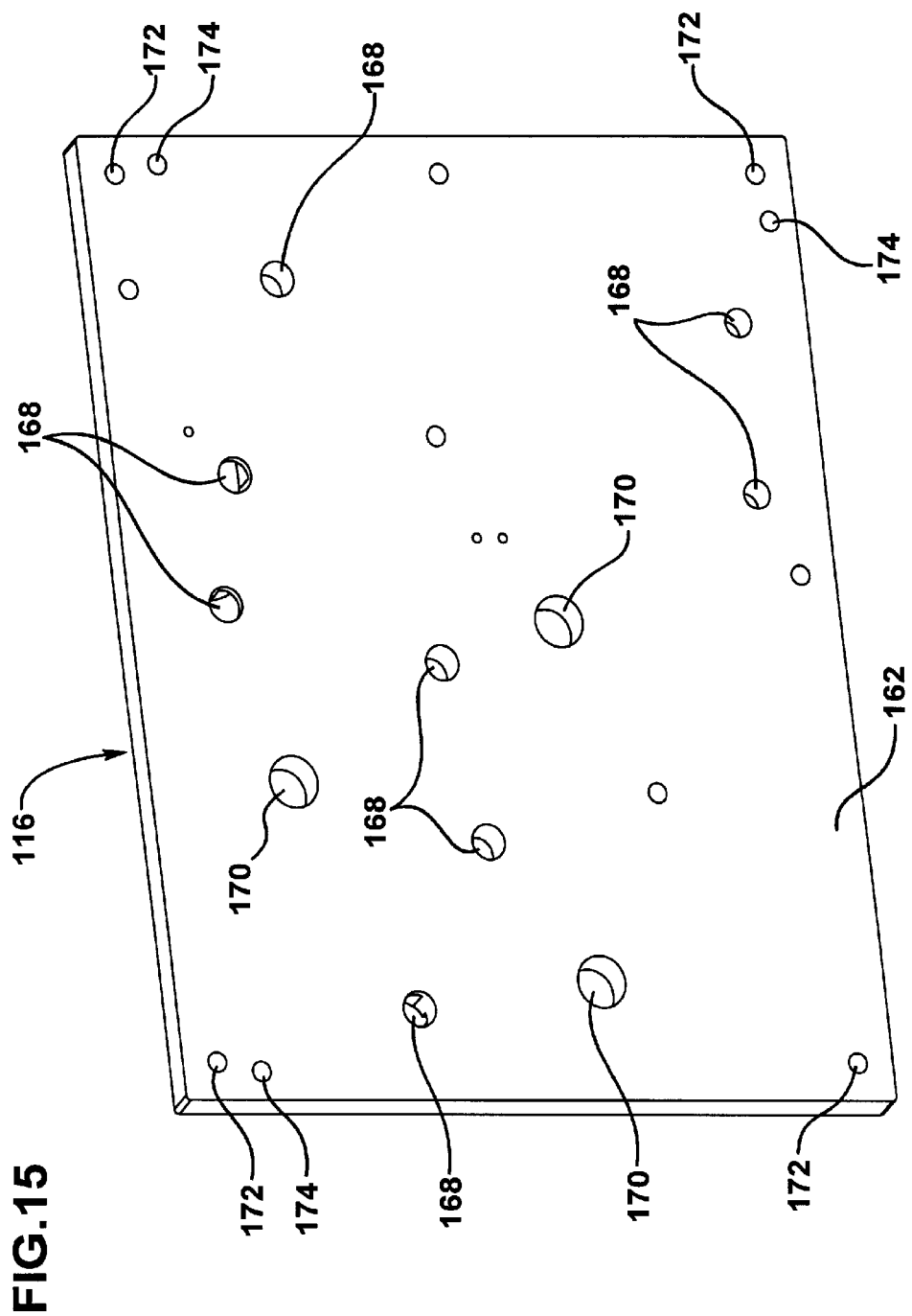
FIG. 15 is a perspective view of the back face of the center or second plate 116 of the manifold illustrated in FIG. 9.

Plate 116 includes a front face 160 (FIGS. 10 and 14) and a back face 162 (FIGS. 11 and 15). The back face 162 is adapted to be aligned with plate 112 and to abut the front face 120 of plate 112 to cover or close the circuitry in the front face 160 of plate 116. Plate 116 includes a plurality of channels 164 and chambers 166 machined in the front face 160. Similar to channels 124 and chambers 126, channels 164 and chambers 166 perform the required pneumatic logic flow of the manifold 110, accomplish pneumatic timing functions and provide system stabilization. Plate 116 contains pneumatic inlet and outlet ports or apertures 168 of varying size for facilitating pneumatic communication between the pipe bracket and the circuitry in plate 116, between the circuitry in plate 112 and the circuitry in plate 116, and to the pneumatic devices mounted on manifold 110. Plate 116 also includes: (i) mounting apertures 170 for facilitating mounting the manifold 110 to the pipe bracket; (ii) bolt apertures 172 for facilitating the fastening or attachment of the plates 112, 116 and 118 to each other; and (iii) corresponding alignment apertures 174 aligned with alignment apertures 134 in plate 112 for receiving alignment pins (not shown) for aligning the plates 112, 116 and 118 during assembly.

Plate 118 includes a front face 180 (FIGS. 10 and 16) and a back face 182 (FIGS. 11 and 17). The back face 182 is adapted to be aligned with and to abut the front face 160 of plate 116 to cover or close the circuitry in the front face 160 of plate 116. Plate 118 does not include any channels or chambers. Plate 118 contains a plurality of sets of closely spaced-apart relatively small diameter pneumatic inlet and outlet ports, through-holes or apertures 184 for facilitating pneumatic communication between the pipe bracket and the circuitry in plates 112 and 116 with the pneumatic devices (not shown) mounted on the front face 180 of plate 118 of manifold 110. Each set of closely spaced-apart apertures 184 collectively allow a sufficient volume of pneumatic fluid for a pneumatic device to pass through the plate 118 which is approximately equal to the amount of pneumatic fluid which would pass through a slot in plate 118. Plate 118 includes mounting apertures 186 adjacent to the apertures 184 for facilitating mounting of the pneumatic devices on the front face 180 of plate 118.

Plate 118 further includes pneumatic inlet and outlet ports or apertures 185 for facilitating pneumatic communication between the pipe bracket or the circuitry in plates 112 and 116 and the pneumatic devices (not shown) mounted on the front face 180 of plate 118. Plate 118 further includes: (i) mounting apertures 190 aligned with mounting apertures 170 and 130 in plates 116 and 112, respectively, for facilitating mounting the manifold 110 to the pipe bracket; (ii) counter-bored bolt apertures 192 aligned with bolt apertures 172 and 132 in plates 116 and 112, respectively, for facilitating the fastening or attachment of the plates 112, 116 and 118 to each other; and (iii) alignment apertures 194 aligned with alignment apertures 174 and 134 in plates 116 and 112, respectively, for receiving alignment pins (not shown) for aligning the plates 112, 116 and 118 during manufacture and assembly.

Plate 118 further includes an upside down U-shaped slot or cut-out 200 suitably sized to receive a valve (not shown) such as a mechanical control valve or release adapter. This enables the use of a taller component while reducing the height of an entire assembly. Moreover, the release adapter must be in a precise location relating to other valves. The valve extends through the slots and is directly attached to plate 116.

In manifold 110, plate 116 (and in particular the back face 162) functions as the cover plate for or covers the circuitry in the front face 120 of plate 112, and plate 118 (and in particular the back face 162) functions as a cover plate for or covers the circuitry in the front face 160 of plate 116. This enables the channels and chambers in plate 116 to overlap the channels and chambers in plate 112, which reduces the circuitous paths of the channels and enables larger channels which are less likely to be blocked by adhesive. The channels can be further adjusted to allow bonding material to have more surface area.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims. All patents cited herein are hereby incorporated by reference in their entirety and relied upon.

The invention is hereby claimed as follows:

1. A manifold for railroad car brakes having ports for one or more pneumatic devices, sources of pneumatic fluid and pneumatic circuits connected to said manifold, said manifold comprising:

a first plate having a front face with one or more channels and chambers therein and a back face with at least one port connected to at least one of said channels and chambers therein; and a second plate having a front face with at least one aperture which extends through the second plate and a back face which abuts the front face of the first plate to cover the channels and chambers in the front face of the first plate, said second plate including a slot to enable a pneumatic device to extend through the second plate and to be mounted on the front face of the first plate.

2. A manifold for railroad car brakes having ports for one or more pneumatic devices, sources of pneumatic fluid and pneumatic circuits connected to said manifold, said manifold comprising:

a first plate having a front face with one or more channels and chambers therein and a back face with at least one port connected to at least one of said channels and chambers therein;

a second plate having a front face with apertures which extend through the second plate and one or more channels and chambers therein, and a back face which abuts the front face of the first plate to cover the channels and chambers in the front face of the first plate, said back face having at least one port connected to at least one of said channels and chambers therein; and a third plate having a front face with apertures which extend through the third plate and a back face which abuts the front face of the second plate to cover the channels and chambers in the front face of the second plate, said third plate defining at least one series of relatively small closely spaced-apart apertures which collectively allow a sufficient volume of pneumatic fluid for a pneumatic device to pass through the third plate.

3. The manifold of claim 2, wherein the first, second and third plates include alignment apertures adapted to receive alignment pins for properly aligning the plates during assembly.

4. A manifold for railroad car brakes having ports for one or more pneumatic devices, sources of pneumatic fluid and pneumatic circuits connected to said manifold, said manifold comprising:

a first plate having a front face with one or more channels and chambers therein and a back face with at least one port connected to at least one of said channels and chambers therein;

a second plate having a front face with one or more channels and chambers therein and a back face with at least one port connected to at least one of said channels and chambers therein, said second plate connected to said first plate with the back face of the second plate facing the front face of the first plate; and a third plate having a front face, a back face and at least one aperture extending between said front face and said back face and aligned with said channels or chambers on said front face of said second plate, said back face of said third plate facing said front face of said second plate, said third plate including a slot to enable a pneumatic device to extend through the third plate and to be mounted on the front face of the second plate.

5. The manifold of claim 4, wherein the back face of the second plate abuts the front face of the first plate to cover the channels and chambers in the front face of the first plate.

6. The manifold of claim 4, which further includes a cover plate disposed between the first plate and the second plate to cover the channels and chambers in the front face of the first plate.

7. The manifold of claim 6, wherein the third plate defines at least one series of relatively small closely spaced-apart apertures which collectively allow a sufficient volume of pneumatic fluid for a pneumatic device to pass through the second plate.

8. A manifold for railroad car brakes having ports for one or more pneumatic devices, sources of pneumatic fluid and pneumatic circuits connected to said manifold, said manifold comprising:

a first plate having a front face with one or more channels and chambers therein and a back face with at least one port connected to at least one of said channels and chambers therein; and a second plate having a front face, a back face and at least one aperture extending between said front face and said back face and aligned with said channels or chambers on said front face of said first plate, said back face of said second plate facing said front face of said first plate, said second plate defining at least one series of relatively small closely spaced-apart apertures which collectively allow a sufficient volume of pneumatic fluid for a pneumatic device to pass through the second plate.

9. A manifold for railroad car brakes having ports for one or more pneumatic devices, sources of pneumatic fluid and pneumatic circuits connected to said manifold, said manifold comprising:

a first plate having a front face with one or more channels and chambers therein and a back face with at least one port connected to at least one of said channels and chambers therein;

a second plate having a front face with at least one aperture which extends through the second plate and a back face which abuts the front face of the first plate to cover the channels and chambers in the front face of the first plate, said second plate defining at least one series of relatively small closely spaced-apart apertures which collectively allow a sufficient volume of pneumatic fluid for a pneumatic device to pass through the second plate;

a third plate having a front face with one or more channels and chambers therein and a back face which abuts the front face of the second plate and includes at least one port connected to at least one of said channels and chambers therein; and a fourth plate having a front face having at least one aperture which extends through the fourth plate and a back face which abuts the front face of the third plate to cover the channels and chambers in the front face of the third plate.

10. The manifold of claim 9, wherein the fourth plate defines at least one series of relatively small closely spaced-apart apertures which collectively allow a sufficient volume of pneumatic fluid for a pneumatic device to pass through the fourth plate.

11. The manifold of claim 10, wherein the fourth plate is made of steel and defines suitable tolerances for the pneumatic devices attached to the fourth plate.

12. The manifold of claim 9, wherein the first and second plates are larger than the third and fourth plates.

13. The manifold of claim 12, wherein the first and second plates are aluminum and the third and fourth plates are steel.

14. The manifold of claim 9, wherein the first and second plates define corresponding alignment apertures adapted to receive alignment pins for aligning the plates during assembly.

* * * * *